US009576022B2

(12) United States Patent
Braham et al.

(10) Patent No.: US 9,576,022 B2
(45) Date of Patent: Feb. 21, 2017

(54) IDENTIFYING MISSING CONTENT USING SEARCHER SKILL RATINGS

(71) Applicant: INTERNATIONAL BUSINESS MACHINES CORPORATION, Armonk, NY (US)

(72) Inventors: Adam D. Braham, Rochester, MN (US); Doyle J. McCoy, Rochester, MN (US); Jeffrey A. Schmidt, Rochester, MN (US); Gregory J. Watts, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

(21) Appl. No.: 13/750,395

(22) Filed: Jan. 25, 2013

(65) Prior Publication Data

US 2014/0214881 A1 Jul. 31, 2014

(51) Int. Cl.
*G06F 7/00* (2006.01)
*G06F 17/30* (2006.01)

(52) U.S. Cl.
CPC ............................... *G06F 17/30424* (2013.01)

(58) Field of Classification Search
CPC ............ G06F 17/30864; G06F 17/3053; G06F 17/30648; G06F 17/30424; G06F 17/30657; G06F 17/30675; G06F 17/30876; G06F 17/3089; G06F 17/30899; G06F 17/30997; G06F 17/30731; G06F 17/30902; G06F 17/30672; G06F 17/30873; G06F 19/28
USPC ......... 707/748, 723, 732, E17.108, E17.014, 707/769, 999.003, E17.001, E17.017, 780, 707/999.005, E17.069, 766, 771, 713, 707/E17.111, 999.002, 999.01
See application file for complete search history.

(56) References Cited

U.S. PATENT DOCUMENTS

| | | | |
|---|---|---|---|
| 6,785,671 | B1 | 8/2004 | Bailey et al. |
| 7,421,424 | B2 * | 9/2008 | Tago ................. G06F 17/30424 |
| 7,640,232 | B2 | 12/2009 | Fish et al. |
| 7,779,013 | B2 | 8/2010 | Chi et al. |
| 7,801,885 | B1 | 9/2010 | Verma |
| 7,865,496 | B1 | 1/2011 | Schiller |
| 7,904,440 | B2 | 3/2011 | Anderson et al. |

(Continued)

FOREIGN PATENT DOCUMENTS

EP 1320042 A2 6/2003

OTHER PUBLICATIONS

Morris et al., "Team Search: Comparing Techniques for Co-Present Collaborative Search of Digital Media", IEEE Computer Society, 2006, 8 pages.

(Continued)

*Primary Examiner* — Usmaan Saeed
*Assistant Examiner* — Cecile Vo
(74) *Attorney, Agent, or Firm* — William Hartwell; Andrew M. Calderon; Roberts Mlotkowski Safran Cole & Calderon P.C.

(57) ABSTRACT

An approach for identifying missing content is provided. An approach includes: receiving a search string; determining a skill rating associated with a searcher that generated the search string; and searching a database using the search string. The approach also includes: updating at least one of a first score associated with the search string and a second score associated with the database based on the skill rating; and generating an alert based on one of the first score exceeding a first threshold and the second score exceeding a second threshold.

20 Claims, 5 Drawing Sheets

Receiving a search string — 392

Determining a skill rating associated with a searcher that generated the search string — 393

Searching a database using the search string — 394

Updating at least one of a first score associated with the search string and a second score associated with the database based on the skill rating — 395

Generating an alert based on one of the first score exceeding a first threshold and the second score exceeding a second threshold — 396

(56) References Cited

U.S. PATENT DOCUMENTS

| | | | |
|---|---|---|---|
| 8,019,744 B1 | 9/2011 | Roizen et al. | |
| 8,099,417 B2 | 1/2012 | Gollapudi et al. | |
| 8,117,197 B1 | 2/2012 | Cramer | |
| 8,433,778 B1 | 4/2013 | Shreesha et al. | |
| 8,498,974 B1 | 7/2013 | Kim et al. | |
| 8,762,373 B1 | 6/2014 | Zamir et al. | |
| 8,825,644 B1 | 9/2014 | Crichton et al. | |
| 9,053,195 B2 * | 6/2015 | Yang | G06F 17/30867 |
| 2004/0083195 A1 | 4/2004 | McCord et al. | |
| 2006/0173828 A1 | 8/2006 | Rosenberg | |
| 2007/0016545 A1 | 1/2007 | Broder et al. | |
| 2008/0021721 A1 | 1/2008 | Jones et al. | |
| 2008/0104045 A1 * | 5/2008 | Cohen | G06F 17/30867 |
| 2008/0221983 A1 | 9/2008 | Ausiannik et al. | |
| 2008/0249890 A1 | 10/2008 | Sower et al. | |
| 2008/0319976 A1 | 12/2008 | Morris et al. | |
| 2009/0119283 A1 | 5/2009 | Muehlbauer et al. | |
| 2010/0077301 A1 | 3/2010 | Bodnick et al. | |
| 2010/0088331 A1 | 4/2010 | White et al. | |
| 2010/0235338 A1 | 9/2010 | Gabriel | |
| 2011/0004609 A1 | 1/2011 | Chitiveli et al. | |
| 2011/0087661 A1 | 4/2011 | Quick et al. | |
| 2011/0125744 A1 | 5/2011 | Immonen et al. | |
| 2011/0320441 A1 | 12/2011 | Lee et al. | |
| 2012/0084283 A1 | 4/2012 | Chitiveli et al. | |
| 2012/0233176 A1 | 9/2012 | Korn et al. | |
| 2012/0278318 A1 | 11/2012 | Reznik | |
| 2013/0071831 A1 * | 3/2013 | Jones | G09B 7/00<br>434/362 |

OTHER PUBLICATIONS

Garcia-Alvarado et al., "Query Recommendation in Digital Libraries Using OLAP", Keys '10, Inidianapolis, Jun. 6, 2010, 2 pages.

Addison et al., "Evaluating a Computer-Based Information Service", Communicating Information, Proceedings of the 43rd ASIS Annual Meeting, vol. 17, 1981, Abstract only (1 page).

Office Action dated Nov. 4, 2015 in U.S. Appl. No. 13/750,365, 45 pages.

Office Action dated May 20, 2016 in U.S. Appl. No. 13/750,365.

Notice of Allowance dated Nov. 18, 2016 in U.S. Appl. No. 13/750,365.

* cited by examiner

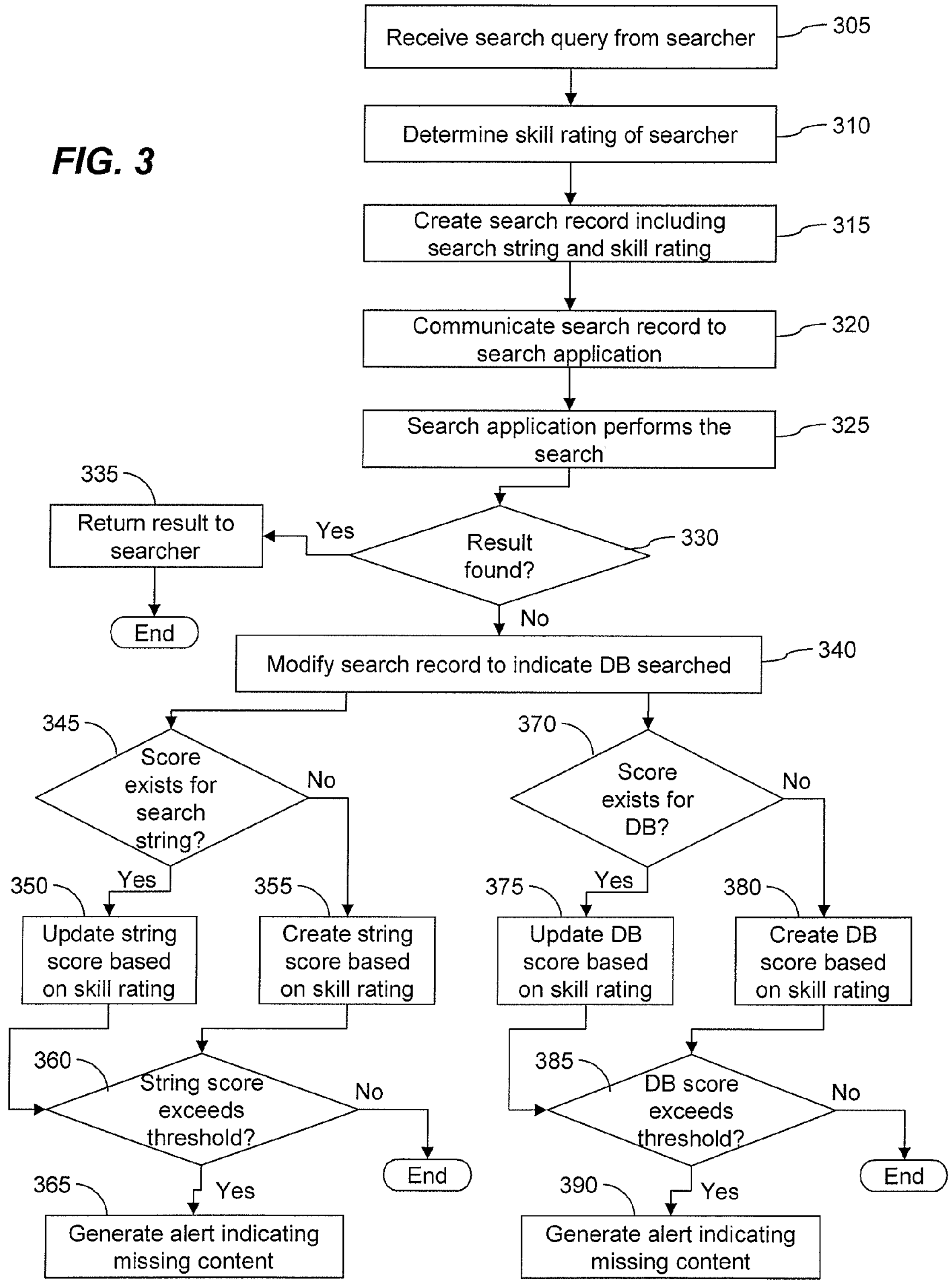
FIG. 3
Receive search query from searcher
305
Determine skill rating of searcher
310
Create search record including search string and skill rating
315
Communicate search record to search application
320
Search application performs the search
325
Result found?
330
Yes
Return result to searcher
335
End
No
Modify search record to indicate DB searched
340
Score exists for search string?
345
Yes
No
Update string score based on skill rating
350
Create string score based on skill rating
355
String score exceeds threshold?
360
No
End
Yes
Generate alert indicating missing content
365
Score exists for DB?
370
Yes
No
Update DB score based on skill rating
375
Create DB score based on skill rating
380
DB score exceeds threshold?
385
No
End
Yes
Generate alert indicating missing content
390

400

405 410 415

| Search String | User ID | Skill Rating |
|---|---|---|
| "xyz" | Bob | 5 |

| Search String | User ID | Skill Rating | Database Searched | Failed Search |
|---|---|---|---|---|
| "xyz" | Bob | 5 | DB1 | True |

| Search String | Cumulative Score | Threshold | Score Exceeds Threshold? |
|---|---|---|---|
| "xyz" | 15 | 10 | True |
| "abc" | 3 | 10 | False |
| "def" | 12 | 13 | False |

| Database/ Content Type | Cumulative Score | Threshold | Score Exceeds Threshold? |
|---|---|---|---|
| DB1 | 20 | 15 | True |
| DB2 | 12 | 15 | False |
| DB3 | 9 | 15 | False |

FIG. 8

IDENTIFYING MISSING CONTENT USING SEARCHER SKILL RATINGS

TECHNICAL FIELD

The present invention generally relates to computer-based searching and, more particularly, to determining the absence of searchable content using searcher skill ratings.

BACKGROUND

Searchable content is highly useful in customer support organizations. As a result, businesses expend great amounts of resources to provide and maintain searchable content both for inside the company for their support teams, but also for external customer searching to find answers to customer-identified problems. Searching a knowledgebase and tracking metrics on search results does not account for the possibility that knowledge may be lacking from the knowledgebase, which knowledge is sought by and would have value to users.

SUMMARY

In a first aspect of the invention, there is a method implemented in a computer infrastructure comprising a combination of hardware and software. The method includes: receiving a search string; determining a skill rating associated with a searcher that generated the search string; and searching a database using the search string. The method also includes: updating at least one of a first score associated with the search string and a second score associated with the database based on the skill rating; and generating an alert based on one of the first score exceeding a first threshold and the second score exceeding a second threshold.

In another aspect of the invention, there is a system implemented in hardware and comprising a computer infrastructure adapted to: receive a search string; determine a skill rating associated with a searcher that generated the search string; and search a database using the search string. The computer infrastructure is further adapted to: determine the search string matches an existing search string in a data structure associated with failed searches; and update a score associated with the existing search string based on the skill rating.

In an additional aspect of the invention, there is a computer program product comprising a computer usable storage medium having readable program code embodied in the medium. The computer program product includes at least one component adapted to: determine a skill rating of a searcher that submits a search query; determine the search query results in a failed search; and update a cumulative score based on the skill rating and the failed search.

In another aspect of the invention, there is a method of deploying a system for identifying missing content. The method includes providing a computer infrastructure that is adapted to receive search queries from a plurality of searchers. The computer infrastructure is further adapted to determine a respective skill rating for each one of the plurality of searchers. The computer infrastructure is also adapted to update at least one cumulative score associated with a failed search based on the respective skill rating for each one of the plurality of searchers. The computer infrastructure is additionally adapted to indicate missing content when the at least one cumulative score exceeds a threshold.

In a further aspect of the invention, there is a computer system for identifying missing content. The system includes a CPU, a computer readable memory and a computer readable storage media. The system also includes first program instructions to receive search queries from a plurality of searchers. The system additionally includes second program instructions to determine a respective skill rating for each one of the plurality of searchers. The system further includes third program instructions to update at least one cumulative score associated with a failed search based on the respective skill rating for each one of the plurality of searchers. The system also includes fourth program instructions to generate an alert indicating missing content when the at least one cumulative score exceeds a threshold. The first, second, third and fourth program instructions are stored on the computer readable storage media for execution by the CPU via the computer readable memory. The at least one cumulative score is associated with one of: a search string contained in the search query, and a database searched in the failed search. The respective skill rating for each one of the plurality of searchers varies based on a level of search skill of each one of the plurality of searchers.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 3 and 4 show exemplary flow diagrams for implementing methods in accordance with aspects of the invention; and FIGS. 5-8 show exemplary data structures in accordance with aspects of the invention.

DETAILED DESCRIPTION

Figure 1:
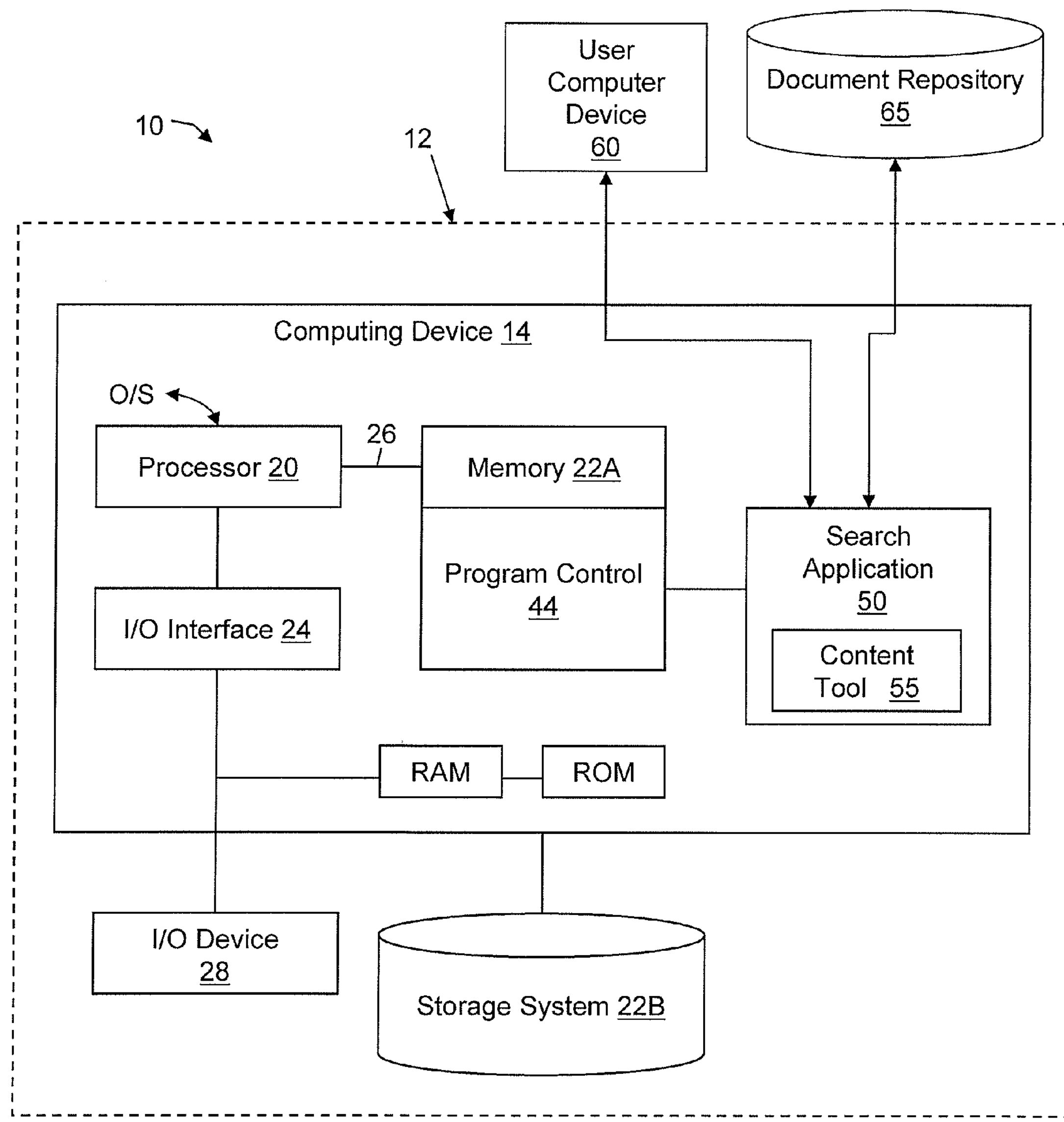
FIG. 1 is an illustrative environment for implementing the steps in accordance with aspects of the invention.

The present invention generally relates to computer-based searching and, more particularly, to determining the absence of searchable content using user search skill ratings. According to aspects of the invention, the skill of searchers and failed searches are used to identify missing content in a searchable knowledgebase. In embodiments, when a searcher performs a failed search (e.g., queries a database with a search string and does not get a hit), a cumulative score for each of the search string and the database is updated based on the skill rating of the searcher. The cumulative scores may be updated based on searches from plural different searchers. Missing content of the knowledgebase as a whole (e.g., plural databases) is identified by comparing the search string cumulative score to a threshold. Missing content of a particular database included in the knowledgebase is identified by comparing the database cumulative score to a threshold. In this manner, implementations of the invention provide the ability to identify content that is missing from a searchable knowledgebase based on the skill of searches using the knowledgebase.

Implementations of the invention utilize a skill rating associated with each searcher of the knowledgebase. In embodiments, the skill rating is a relative measure of the searcher's effectiveness and/or efficiency in searching. Each searcher may have a skill rating, and the skill ratings may be determined in any suitable manner. For example, a particular searcher's skill rating may be based on at least one of: time spent reviewing result set of a search before finding a result document; a number of documents reviewed in the result set before finding a result document; a rank of the result document contained in the ranked result set; and feedback from other users regarding the usefulness of the result document. Different searchers may have different skill ratings, although it is within the scope of the invention for two or more searchers to have an identical skill rating.

According to aspects of the invention, the searcher skill ratings are leveraged to intelligently identify missing content by weighting the cumulative scores based on the skill ratings. In embodiments, when a searcher performs a failed search, the appropriate cumulative score is updated by an amount that is proportional to the skill rating of the searcher. For example, the cumulative score is adjusted less as a result of failed searches by lower-skilled searchers, e.g., since these failed searches are more likely to result from poorly designed search strings. Conversely, the cumulative score is adjusted more as a result of failed searches by higher-skilled searchers, e.g., since these failed searches are more likely to indicate missing content.

In this manner, implementations of the invention utilize the relative skills of the searchers to predict when there is a gap in searchable content. For example, when a lower skilled person performs a search and cannot find the documentation, it may be simply because they are not very effective at searching and not skilled enough to find a particular item. Accordingly, failed searches from lower skilled searchers are weighted less in the cumulative scores, such that it takes relatively more failed searches from lower skilled searchers to accumulate and reach a predefined threshold that indicates missing searchable content. On the other hand, a higher skilled searcher is more likely to be accurate in finding documentation matching their searches. Therefore, failed searches from higher skilled searchers are weighted more in the cumulative scores, such that it takes relatively less failed searches from higher skilled searchers to accumulate and reach the predefined threshold that indicates missing searchable content.

In accordance with aspects of the invention, missing content is identified by comparing the cumulative scores to predefined thresholds. In embodiments, the thresholds may be based on one of: a specific search string not being found, individual databases, and broad categories of content or knowledge. For example, by collecting the number of missed results (e.g., failed searches) for a content type or entire database (e.g., over time and based on cumulative search skills being added up for that database), a first database with a first set of documents can be compared to a second database with a second set of documents in order to determine which database (e.g., which set of documents) has the higher number of failed searches. This information can be useful in determining gaps in documentation on a large scale. For example, when a standard knowledgebase has relatively few missed searches, while a database that contains internal technical content has a higher number of failed searches from higher skilled people, this may indicate that the more skilled people are looking for more technical content to resolve issues. This information may cause an entity to take action such as increase the amount of technical content that is being sought by the higher skilled searches.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a computer infrastructure comprising a server 12 or other computing system that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a search application 50 and a content tool 55 that is configured to perform one or more of the processes described herein. The search application 50 and content tool 55 can be implemented as one or more program code in the program control 44 stored in memory 22A as separate or combined modules. Additionally, the search application 50 and content tool 55 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The search application 50 may be any suitable application that accepts a search input from a searcher via a user computer device 60, searches stored data (e.g., a document repository 65) based on the input, and returns a ranked result set to the searcher via the user computer device 60. In accordance with aspects of the invention, the content tool 55 maintains cumulative scores that are derived from failed searches and user data (e.g., user skill rating) associated with the failed searches, and identifies missing content when a cumulative score exceeds a threshold value. The search application 50 and content tool 55 may be separate applications. For example, the content tool 55 may be an add-on or plug-in used with an existing search application 50. In other embodiments, the functionality of the search application 50 and content tool 55 may be provided by a single application.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
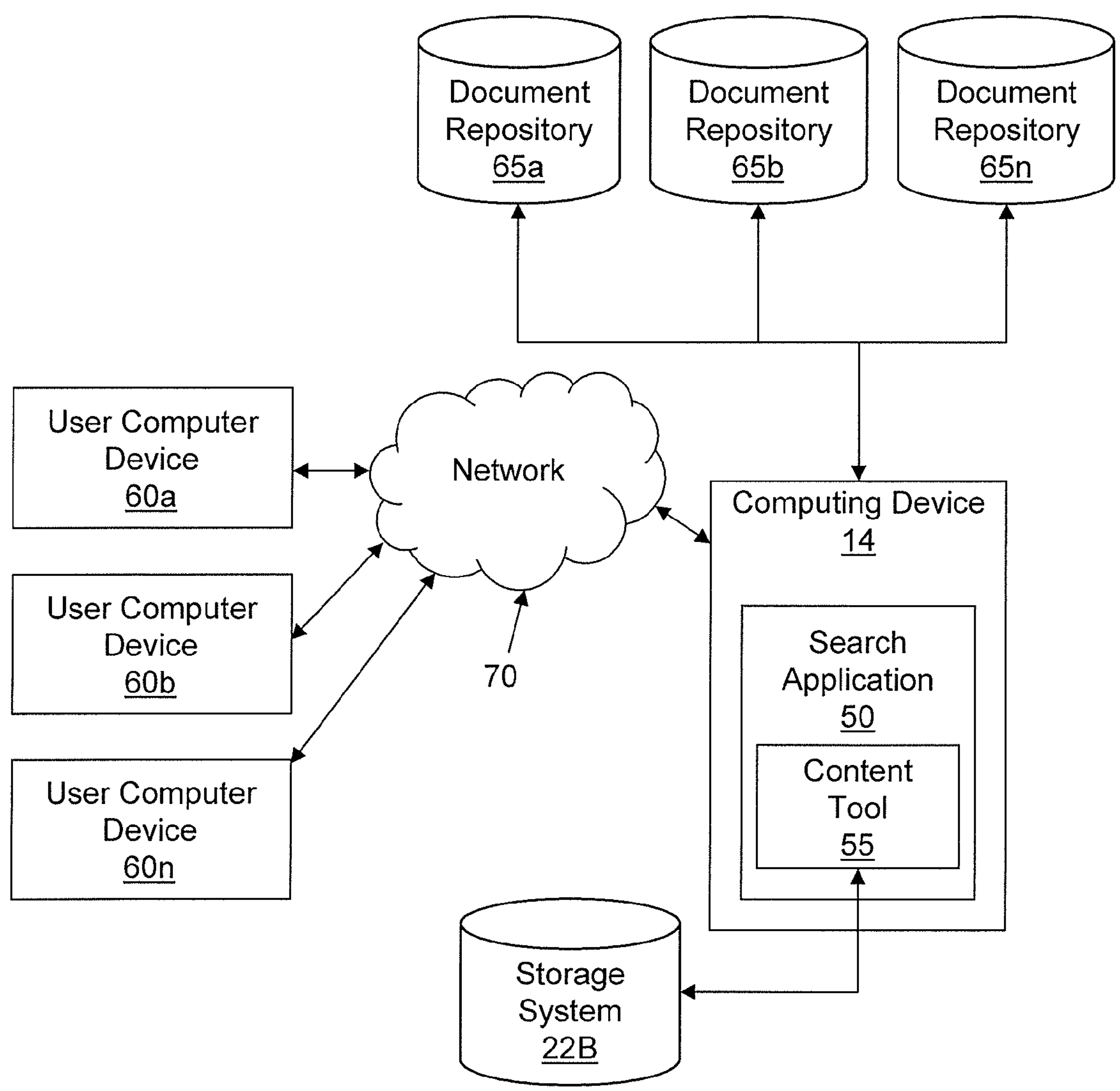
FIG. 2 shows a block diagram of a system in accordance with aspects of the invention.

FIG. 2 shows a block diagram of an exemplary system in accordance with aspects of the invention. In embodiments, the system includes the computing device 14 that runs the search application 50 and the content tool 55. The computing device 14 is in communication with one or more document repositories 65*a*, 65*b*, . . . , 65*n*, the contents of which are searchable using the search application 50. One or more user computer devices 60*a*, 60*b*, . . . , 60*n* are in communication with the computing device 14 via a network 70. The user computer devices 60*a-n* may comprise any suitable computing device including, but not limited to, a desktop computer, laptop computer, tablet computer, etc. In embodiments, the user computer devices 60*a-n* may include a client program or software application that provides an interface to the search application 50, such that a searcher (e.g., a searcher) may utilize using one of the user computer devices 60*a-n* to perform a search of the documentation stored in the one or more document repositories 65*a-n*. The document repositories 65*a-n* may comprise separate databases that are independently searchable and which collectively form a knowledgebase.

The content tool 55 may store and access different skill ratings for different searchers in storage system 22B. The searcher (e.g., search user) is a person who performs a search using a search engine (e.g., the search application 50). In embodiments, the document repositories 65*a-n* are pre-configured document repositories (e.g., private and/or proprietary databases), as opposed to the open-ended World Wide Web, and the search application 50 is a local search application that searches only the one or more document repositories 65*a-n*. The scope of the invention is not limited to this configuration, however, and aspects of the invention may be implemented with searches performed on the World Wide Web. The network 70 connecting the computing device 14 and the user computer devices 60*a-n* may be any type of network, such as a local area network (LAN) or a wide area network (WAN) including the Internet.

The search application 50 may comprise plural different search applications. For example, a first search application may be directed to searching information technology support documents stored in one of the document repositories 65*a-n*, and a second search application may be directed to searching legal documents stored in another one of the document repositories 65*a-n*. The invention is not limited to these two examples, and any number of any types of search application may be used within the scope of the invention. Each separate search application may be embodied as a separate application running on the computing device 14 or, alternatively, separate search applications may run on separate servers.

Flow Diagrams

Figure 4:
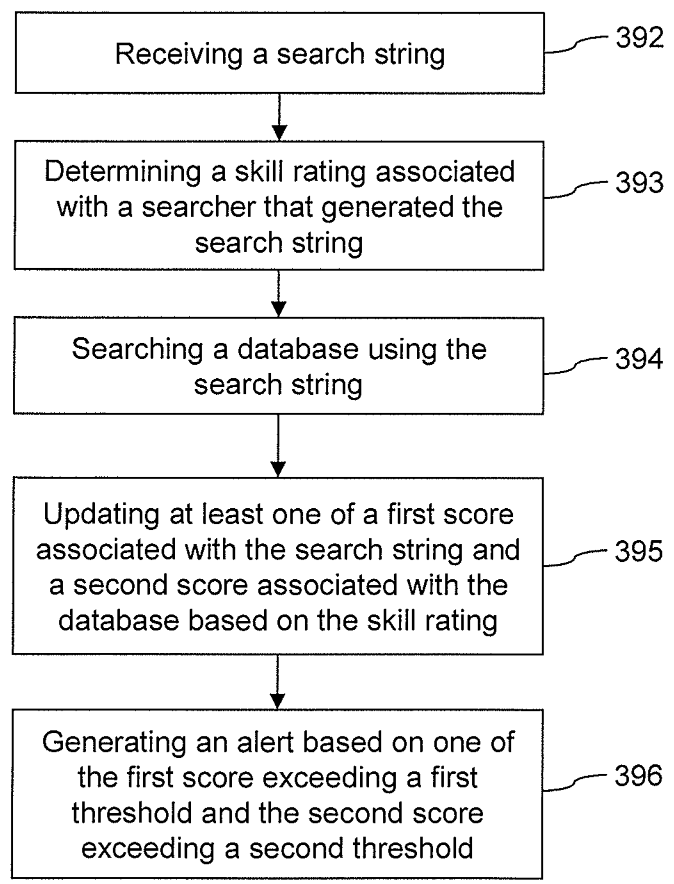

FIGS. 3 and 4 show exemplary flowcharts and/or block diagrams for performing aspects of the present invention. The steps and/or functions of FIGS. 3 and 4 may be implemented in the environment of FIGS. 1 and 2, for example.

The flowcharts and/or block diagrams in the Figures illustrate the architecture, functionality, and operation of possible implementations of systems, methods and computer program products according to various embodiments of the present invention. In this regard, each block in the flowcharts and/or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1 and 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 3 depicts an exemplary flowchart depicting a process in accordance with aspects of the present invention. At step 305, a computing device executing a search application (e.g., computing device 14 executing search application 50) receives a search query containing a search string from a searcher via a user computer device (e.g., user computer device 60*a*). In embodiments, the computing device receives the search query via data transfer over a network (e.g., network 70). In embodiments, the search query also includes data indicating an identity of the searcher. For example, the search query may include a user identification (user ID) that is unique to the searcher and that is determined when the searcher logs on to a client of the search application on the user computer device.

At step 310, the computing device determines a skill rating of the searcher that submitted the search query at step 305. In embodiments, the skill rating and user ID of each searcher is maintained in a storage system (e.g., storage system 22B), and the computing device accesses the storage system to obtain the skill rating associated with the user ID that is included in the search query of step 305. Step 310 may be performed by a content tool (e.g., content tool 55).

At step 315, the computing device creates a search record (e.g., a data structure) that includes the user ID, the skill rating, and the search string. At step 320, the content tool passes the search record to the search application, and at step 325 the search application performs a search of a database (e.g., one or more of document repositories 65*a-n*) based on the search string in the search record. The search at step 325 may be performed using conventional search techniques.

At step 330, the computing device determines whether a hit (i.e., a match) was found during the search that was performed at step 325. In particular, the search application determines that the search returned one or more documents that match the search string (e.g., a successful search), or that the search returned zero documents that match the search string (e.g., a failed search). In the case of a successful search, the computing device communicates the search result to the searcher at step 335 and the process ends. In the case of a failed search, then at step 340 the search application modifies the search record (e.g., from step 315) to indicate a failed search and to include the identity of the database that was searched at step 325. The database that was searched may have been manually designated by the searcher in the search query, or may have been automatically designated by the search application according to predefined rules. Step 340 also includes the search application passing the modified search record back to the content tool. After step 340, the process proceeds along two parallel paths, although the paths may be performed in parallel, serially, or in any other desired order.

At step 345, the content tool determines whether a score (e.g., a cumulative score) exists for the search string contained in the modified search record from step 340. In embodiments, the content tool maintains a string miss table (e.g., a data structure) that associates a cumulative score with a search string of a failed search. At step 345, the content tool accesses the string miss table and determines whether the search string in the search record matches an existing entry of a search string in the string miss table. A match exists when the search string in the search record exactly matches an existing entry of a search string in the string miss table (e.g., from a previous failed search). A match may also exist when the search string in the search record does not exactly match an existing entry, but is sufficiently similar to an existing entry of a search string in the string miss table based on a predefined metric. For example, a predefined metric may be a threshold percentage (e.g., 90%) of words in common between the search string in the search record and the existing entry, such that a match is deemed to occur when the number of words in common between the search string in the search record and the existing entry exceeds the threshold percentage. Exact word matches, synonyms, and/or common word roots may be used in determining the number of words in common between the search string in the search record and the existing entry.

In the event that the search string in the search record matches an existing entry in the string miss table, then at step 350 the content tool updates the cumulative score associated with the existing entry in the string miss table. In embodiments, the update (e.g., change) to the cumulative score is weighted based on the skill rating of the searcher that is included in the search record. In a particular exemplary embodiment, the weighting is proportional to the skill rating, such that a lower skill rating results in less of a change to the score, and a higher skill rating causes more of a change in the score. For example, the skill rating may be a numeric value and the score may be a numeric value, and the updating at step 350 may include adding the skill rating to the cumulative score and saving the updated (e.g., new) cumulative score in the string miss table with the existing search string. The invention is not limited to adding as described in the example, and any suitable weighted accumulation may be used to update the cumulative score of the existing entry in the string miss table based on the skill rating of the searcher that performed the failed search.

In the event that the search string in the search record does not match an existing entry in the string miss table, then at step 355 the content tool creates a new entry in the string miss table, which new entry includes the search string and a new score associated with the search string. In embodiments, the new score is determined by adding the skill rating to a baseline new score (e.g., zero or any other desired number) and saving the score in the new entry of the string miss table with the search string of the failed search. The invention is not limited to adding as described in the example, and any suitable weighted accumulation may be used to create the new score of the new entry in the string miss table based on the skill rating of the searcher that performed the failed search.

At step 360, the content tool determines whether the score (e.g., the updated score from step 350 or the new score from step 355) exceeds a threshold. In embodiments, the threshold is included in the string miss table (e.g., as a field in the entry associated with the failed search string) and is predefined (e.g., by an administrator). The threshold may be set to any desired value to fine-tune the sensitivity of what constitutes missing content in the knowledgebase.

This path of the process ends when the score does not exceed the threshold at step 360, as this is indicative of there being no or only little missing content in the knowledgebase. On the other hand, in the event the score exceeds the threshold at step 360, the content tool generates an alert at step 365. In embodiments, the alert is a message that is transmitted to an administrator and which indicates the search string of the string miss table whose cumulative score exceeds the threshold.

The second path of the process that branches from step 340 begins at step 370, where the content tool determines whether a score (e.g., a cumulative score) exists for the database identified in the modified search record from step 340. In embodiments, the content tool maintains a database miss table (e.g., a data structure) that associates a cumulative score with a database that was searched in a failed search. The database miss table may contain a number of entries each containing an identity of a database, a cumulative score for that database, and a threshold value, e.g., similar to the search string miss table but utilizing database identities rather than search strings of failed searches. At step 370, the content tool accesses the database miss table and determines whether the database in the search record matches an existing entry of a database in the database miss table.

When the database in the search record does match a database in the database miss table, then at step 375 the content tool updates the score for that database in the database miss table. In embodiments, the updating at step 375 is weighted based on the skill rating of the searcher as defined in the search record and may be performed, for example, in a manner similar to the updating described at step 350. On the other hand, when the database in the search record does not match a database in the database miss table, then at step 380 the content tool creates a new entry including the database and a score for the database in the database miss table. In embodiments, the creating at step 380 is weighted based on the skill rating of the searcher as defined in the search record and may be performed, for example, in a manner similar to the creating described at step 355.

At step 385, the content tool determines whether the database score (e.g., the updated score from step 375 or the new score from step 380) exceeds a threshold. In embodiments, the threshold is included in the database miss table (e.g., as a field in the entry associated with the database) and is predefined (e.g., by an administrator). The threshold may be set to any desired value to fine-tune the sensitivity of what constitutes missing content in the database.

This path of the process ends when the score does not exceed the threshold at step 385, as this is indicative of there being no or only little missing content in this particular database. On the other hand, in the event the score exceeds the threshold at step 385, the content tool generates an alert at step 390. In embodiments, the alert is a message that is transmitted to an administrator and which indicates the database of the database miss table whose cumulative score exceeds the threshold.

By utilizing processes in accordance with aspects of the invention (e.g., as depicted in FIG. 3), an administrator of content databases can identify potential content deficiencies by creating a list of search strings whose score exceeds the threshold (e.g., as indicated by the alert tat step 365). The administrator can also identify individual content databases that are ineffective as indicated by these databases having a score that exceeds the threshold (e.g., as indicated by the alert at step 390). The weighting of scores based on skill rating of the searcher eliminates false hits due to poorly designed search strings by unskilled searchers, and accelerates the identification of missing content when top skill searchers are not finding matches.

FIG. 4 depicts an exemplary flowchart depicting a process in accordance with aspects of the present invention. At step 392, a computing device executing a search application receives a search string. This may be performed, for example, in a manner similar to step 305 and/or in a manner similar to that described with respect to FIG. 2.

At step 393, the computing device determines a skill rating associated with a searcher that generated the search string from step 392. This may be performed, for example, in a manner similar to step 310 and/or in a manner similar to that described with respect to FIG. 2.

At step 394, the computing device searches a database using the search string from step 392. This may be performed, for example, in a manner similar to step 325 and/or in a manner similar to that described with respect to FIG. 2.

At step 395, the computing device updates at least one of a first score associated with the search string and a second score associated with the database based on the skill rating. This may be performed, for example, in a manner similar to one or more of steps 350, 355, 375, and 380 and/or in a manner similar to that described with respect to FIG. 2.

At step 396, the computing device generates an alert based on one of the first score exceeding a first threshold and the second score exceeding a second threshold. This may be performed, for example, in a manner similar to one or more of steps 360, 365, 385, and 390 and/or in a manner similar to that described with respect to FIG. 2.

FIGS. 5-8 show exemplary data structures in accordance with aspects of the invention. For example, FIG. 5 shows an exemplary search record 400 which may be generated at step 315 of the process of FIG. 3. In embodiments, the search record 400 includes a search string 405, a user ID 410, and a skill rating 415 associated with the user ID. Other data may also be included in the search record 400.

FIG. 6 shows an exemplary modified search record 420 that may be generated at step 340 of the process of FIG. 3. In embodiments, the modified search record 420 includes the search string 405, user ID 410, and skill rating 415, as well as an identification 425 of the database that was searched and a flag 430 indicating the search was a failed search (e.g., returned zero hits).

FIG. 7 shows an exemplary string miss table 440 that may be used with steps 345, 350, 355, and 360 of the process of FIG. 3. In embodiments, the string miss table 440 contains plural entries 445*a*-*n* in which each entry includes a search string 450 of a failed search, a cumulative score 455 for that particular search string, and a threshold value 460 for that particular search string. The string miss table 440 may also include a flag 465 in each entry that indicates whether the score exceeds the threshold value. According to aspects of the invention, the string miss table 440 thus may contain plural entries 445*a*-*n* for a number of different failed search strings, each with its own cumulative score. The cumulative score 455 for any one entry may be affected by (e.g., updated based on) plural different searches from one or more of different searchers.

FIG. 8 shows an exemplary database miss table 470 that may be used with steps 370, 375, 380, and 385 of the process of FIG. 3. In embodiments, the database miss table 470 contains plural entries 475*a*-*n* in which each entry includes a database 480 associated with a failed search, a cumulative score 485 for that particular database, and a threshold value 490 for that particular database. The database miss table 470 may also include a flag 495 in each entry that indicates whether the score exceeds the threshold value. According to aspects of the invention, the database miss table 470 thus may contain plural entries 475*a*-*n* for a number of different databases, each with its own cumulative score. The cumulative score 485 for any one entry may be affected by (e.g., updated based on) plural different searches from one or more of different searchers.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure comprising a combination of hardware and software, the method comprising:

receiving a search string to produce a result set for finding a result document;

determining a skill rating associated with a searcher that generated the search string, the skill rating being based on at least a number of documents reviewed in the result set before finding the result document;

searching first and second databases using the search string;

updating at least one of a first score associated with the search string and a second score associated with the first and second databases based on the skill rating;

accumulating a score of the at least one of the first score associated with the search string to generate an accumulated first score and the second score associated with the first and second databases to generate an accumulated second score as search strings are received;

generating an alert based on one of the accumulated first score exceeding a first threshold and the accumulated second score exceeding a second threshold; and comparing the first and second databases to determine which database has a higher number of failed searches, wherein the first threshold is included in a string miss table as a field in an entry associated with a failed search string and is predefined, the second threshold is included in a database miss table as a field in an entry associated with the first and second databases and is predefined, the first score and the second score are updated based on the skill rating of the searcher and searches from a plurality of searchers, and the first score and the second score are adjusted relatively less as a result of failed searches by a lower-skilled searcher and relatively more as a result of failed searches by a higher-skilled searcher.

2. The method of claim 1, further comprising creating a search record containing the search string and the skill rating.

3. The method of claim 2, further comprising communicating the search record to a search application that performs the searching of the first and second databases.

4. The method of claim 3, further comprising modifying the search record, after the performing the search, to include an identity of the first and second databases.

5. The method of claim 4, wherein the modifying the search record includes adding a flag to the search record indicating a failed search.

6. The method of claim 1, wherein the updating comprises adjusting the first score by adding the skill rating to the first score.

7. The method of claim 1, wherein the updating comprises adjusting the second score by adding the skill rating to the second score.

8. The method of claim 1, wherein the updating comprises:

adjusting the first score by adding the skill rating to the first score; and adjusting the second score by adding the skill rating to the second score.

9. The method of claim 1, wherein the generating the alert comprises creating a message indicating missing content.

10. The method of claim 1, wherein:

the receiving the search string comprises receiving a search query from a user computer device; and the search query includes the search string and a user identification.

11. The method of claim 10, wherein the determining the skill rating is based on the user identification.

12. The method of claim 1, wherein a service provider at least one of creates, maintains, deploys and supports the computer infrastructure.

13. The method of claim 1, wherein steps of claim 1 are provided by a service provider on a subscription, advertising, and/or fee basis.

14. The method of claim 1, wherein:

the receiving the search string comprises a search application running a computer device receiving the search string from a user computer device; and the search application performs the searching the first and second databases using the search string.

15. The method of claim 14, wherein the skill rating is based on:

time spent reviewing a result set of a search before finding a result document;

a rank of the result document contained in a ranked result set; and feedback from other users.

16. A system implemented in hardware and comprising a computer infrastructure which comprises a computing system that includes a computing device, the computer infrastructure configured to:

receive a search string to produce a result set for finding a result document;

determine a skill rating associated with a searcher that generated the search string, the skill rating being based on at least a number of documents reviewed in the result set before finding the result document;

search first and second databases using the search string;

determine the search string matches an existing search string in a data structure associated with failed searches;

update a score associated with the existing search string based on the skill rating;

accumulate an overall score as search strings are received by adding scores associated with the received search strings;

compare the first and second databases to determine which database has a higher number of failed searches; and generate an alert based on the accumulated overall score exceeding a threshold, wherein the threshold is included in a string miss table as a field in an entry associated with a failed search string and is predefined, the score is updated based on the skill rating of the searcher and searches from a plurality of searchers, and the score is adjusted relatively less as a result of failed searches by a lower-skilled searcher and relatively more as a result of failed searches by a higher-skilled searcher.

17. The system of claim 16, wherein the computer infrastructure is operable to:

receive a second search string;

determine a second skill rating associated with a second searcher that generated the second search string;

search the first and second databases using the second search string;

determine the second search string matches the existing search string in the data structure; and update the score associated with the existing search string based on the second skill rating.

18. The system of claim 17, wherein the skill rating is different than the second skill rating.

19. The system of claim 16, wherein an alert indicates missing content based on the comparing.

20. The system of claim 16, wherein the computer infrastructure is operable to update a score associated with the first and second databases based on the skill rating.

* * * * *